United States Patent [19]
Fleming et al.

[11] Patent Number: 5,666,356
[45] Date of Patent: Sep. 9, 1997

[54] METHOD AND APPARATUS FOR CONTROLLING CALLS IN A CODE DIVISION MULTIPLE ACCESS SYSTEM

[75] Inventors: Philip Joseph Fleming, Glen Ellyn; Aleksandr Stolyar, Buffalo Grove, both of Ill.

[73] Assignee: Motorola, Inc., Schaumburg, Ill.

[21] Appl. No.: 539,032

[22] Filed: Oct. 4, 1995

[51] Int. Cl.$^6$ .............................. H04B 7/216; H04Q 7/22
[52] U.S. Cl. ...................... 370/328; 370/332; 370/461; 370/230; 455/453
[58] Field of Search .......................... 370/18, 95.1, 328, 370/331, 332, 461, 462, 230; 375/205, 206; 455/33.1, 54.1, 54.2, 56.1, 67.1, 226.1

[56] References Cited

U.S. PATENT DOCUMENTS

| | | | |
|---|---|---|---|
| 5,245,629 | 9/1993 | Hall | 375/205 |
| 5,293,641 | 3/1994 | Kallin et al. | 455/33.1 |
| 5,497,504 | 3/1996 | Acampora et al. | 455/33.2 |
| 5,530,917 | 6/1996 | Andersson et al. | 455/54.1 |
| 5,539,729 | 7/1996 | Bodnar | 370/18 |
| 5,542,093 | 7/1996 | Bodin et al. | 455/33.2 |

*Primary Examiner*—Douglas W. Olms
*Assistant Examiner*—Min Jung
*Attorney, Agent, or Firm*—Richard A. Sonnentaq

[57] ABSTRACT

A method and apparatus for blocking a call attempt in a CDMA system. The method includes the steps of receiving a call attempt request to be placed over a target cell of the CDMA system (202), calculating an effective load for the cell (204), comparing the effective load to a threshold (206), and denying the call attempt request by sending a denial message if the effective load exceeds the threshold (212). The apparatus includes a base station (101) and a base station controller (200) coupled to the base station (101). The base station (101) includes a plurality of transceivers (120) providing a radio communication channel and defining a target cell (130). The base station controller (200) receives a call attempt request to be placed over one of the transceivers (120) of the base station (101). The base station controller (200) calculates an effective load for the base station (101), compares the effective load to a threshold, and denies the call attempt request by sending a denial message if the effective load exceeds the threshold.

7 Claims, 3 Drawing Sheets

METHOD AND APPARATUS FOR CONTROLLING CALLS IN A CODE DIVISION MULTIPLE ACCESS SYSTEM

CROSS REFERENCES

This application is related to commonly assigned copending application Ser. No. 08/408,247 filed Mar. 22, 1995 by Labedz et al. entitled "Method and Apparatus for Limiting Access to a Channel." (pending). The entire contents of the above application is incorporated herein by reference.

FIELD OF THE INVENTION

The present invention relates generally to wireless communication systems and, in particular, to code division multiple access communication systems.

BACKGROUND OF THE INVENTION

Communication systems that utilize coded communication signals are known in the art. One such system is a direct sequence code division multiple access (DS-CDMA) cellular communication system, such as that set forth in the Telecommunications Industry Association/Electronic Industries Association Interim Standard 95 (TIA/ETA IS-95), hereinafter referred to as IS-95. In accordance with IS-95, the coded communication signals used in the DS-CDMA system comprise DS-CDMA signals that are transmitted in a common 1.25 MHz bandwidth to the base sites of the system from communication units, such as mobile or portable radiotelephones, that are communicating in the coverage areas of the base sites. Each DS-CDMA signal includes, inter alia, a pseudo-noise (PN) sequence associated with a particular base site and an identification number of a communicating communication unit.

In conventional CDMA systems, voice quality is degraded as more subscribers originate calls over the system. Therefore, it is desirable to limit the number of calls over a given cell of the CDMA system. One suggested method would be to only allow a fixed number of calls per cell of the CDMA system. However, this method ignores the effects of other cell sites on system performance. Further, to provide greater capacity, it has been suggested to allow more than one carrier per cell of the CDMA system. In wireless communication systems, such as CDMA systems, a premium is placed on call capacity efficiency. Thus it would be desirable for calls placed on one of multiple carriers within a CDMA cell to be selected using an efficient method.

Accordingly, a need exists for a method and apparatus that maintains voice quality in a CDMA system subjected to a high call load that accounts for intercell interference. Further, there is a need for improved efficiency when multiple carriers are used in a base site of a CDMA system.

DESCRIPTION OF A PREFERRED EMBODIMENT

Generally, one aspect of the present invention encompasses a method and apparatus for blocking a call attempt in a CDMA system. The method includes the steps of receiving a call attempt request to be placed over a target cell of the CDMA system, calculating an effective load for the target cell, comparing the effective load to a threshold, and denying the call attempt request by sending a denial message if the effective load exceeds the threshold. The apparatus includes a base station and a base station controller coupled to the base station. The base station includes a plurality of transceivers providing a radio communication channel and defining a target cell. The base station controller receives a call attempt request to be placed over one of the transceivers of the base station. The base station controller calculates an effective load for the base station, compares the effective load to a threshold, and denies the call attempt request by sending a denial message if the effective load exceeds the threshold.

Another aspect of the present invention is directed to a method and apparatus for selecting a carrier from a group of carriers supported by a target cell of a CDMA system. The method includes the steps of calculating a first effective load for a first carrier of the group of carriers, calculating a second effective load for a second carrier of the group of carries, comparing the first effective load to the second effective load, and selecting one of the first and second carriers in response to the comparison. The apparatus includes means for performing the above method steps.

Figure 1:
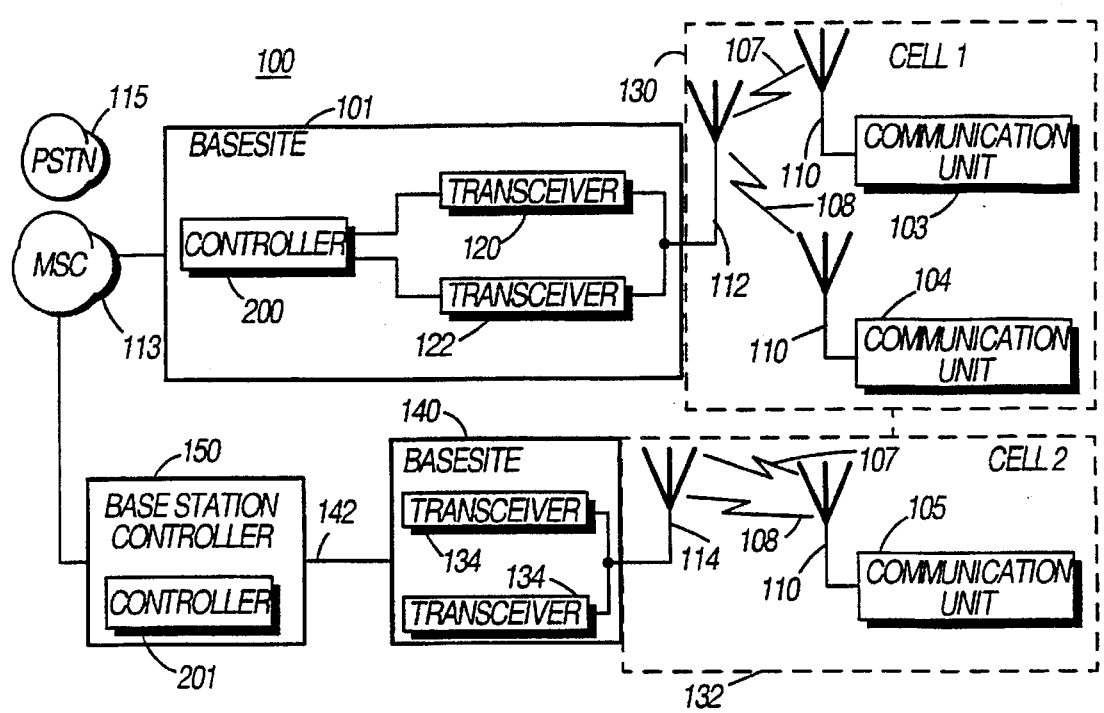
FIG. 1 is a block diagram illustrating a CDMA communication system.
Figure 2:
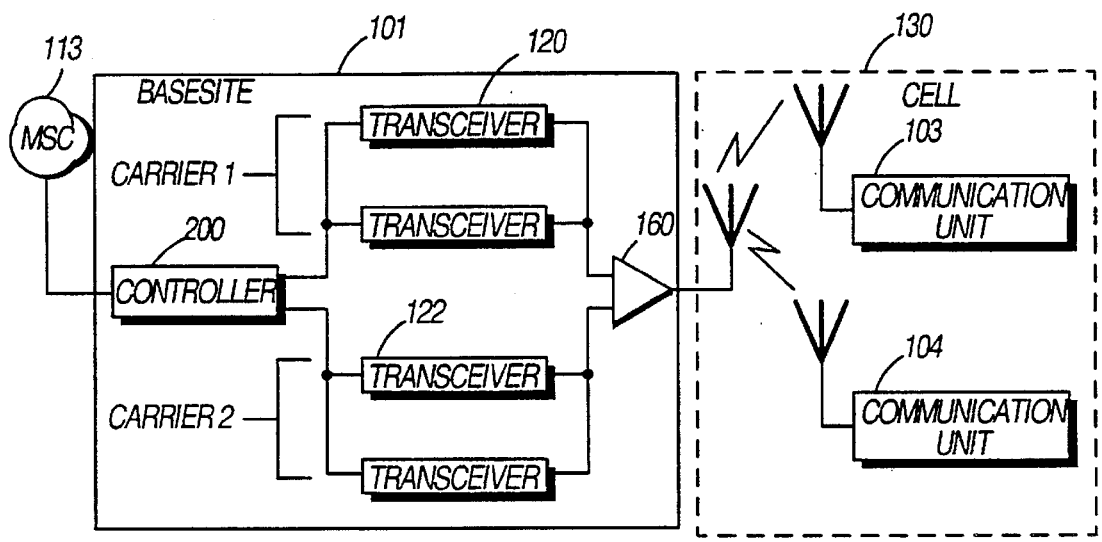
FIG. 2 is a multicarrier system.

The present invention can be more fully described with reference to FIGS. 1–3. FIG. 1 illustrates a communication system 100 including a first base site 101, a second base site 140, and one or more communication units 103, 104, 105. The communication system 100 preferably comprises a direct sequence code division multiple access (DS-CDMA) cellular communication system, such as that set forth in -TIA/ETA IS-95. However, the present invention is equally applicable to a frequency hopping communication system, such as those proposed for the domestic Personal Communication System (PCS). In addition, those skilled in the art will appreciate that the CDMA system may be used as a wireless local loop system. In a cellular communication system, the base site 101 is coupled to a mobile switching center (MSC) 113 that is in turn coupled to the public switched telephone network (PSTN) 115 using known techniques.

The base site 101 preferably includes a plurality of transceivers 120 and 122 (only two shown) that receives coded communication signals from the communication units 103, 104 within a coverage area defined by a first cell 130 of the base site 101 and transmits coded communication signals to the communication units 103, 104 within the first cell 130. The base site 101 also includes appropriate interfaces between the MSC 113, the transceivers 120 and 122, and an antenna 112. In addition, the base site 101 includes a controller 200 which preferably includes a programmable processor such as a MIPS R4400 or a Motorola 68040 type processor. Each of the communication units 103, 104, 105 preferably comprises a mobile or portable radiotelephone, a mobile or portable two-way radio, or other two-way communicating device, such as a computer with radio frequency (RF) transmission and reception capabilities. Each of the communication units has an antenna 110 attached thereto. The base site 140 is substantially similar to base site 101 except that base site 140 communicates with a controller 201 via a communication link 142 since the controller 201 is within a base station controller 150 that is in turn connected to the MSC 113. Base site 140 has an antenna 114 and has a coverage area defined by a second cell 132.

In the preferred DS-CDMA system 100, the coded communication signals comprise DS-CDMA communication signals 107, 108 that are conveyed between the communication units 103, 104, and 105 and the base sites 101, 140 through a respective RF channel within each cell 130, 132. In an alternate frequency hopping communication system, the coded communication signals might comprise slow frequency hopping (SFH) communication signals (multiple modulation symbol time intervals per hop) or fast frequency hopping (FFH) communication signals (multiple hops per modulation symbol time interval). The RF channel includes an uplink (communication units 103, 104 to base site 101) and a downlink (base site 101 to communication units 103, 104). In a preferred embodiment, the uplink comprises a prescribed bandwidth (e.g., 1.25 MHz for IS-95) collectively used by the communication units 103, 104 to transmit multiple coded communication signals 107, 108 (DS-CDMA signals in this case) toward the base site 101. Each DS-CDMA communication signal 107, 108 includes, inter alia, a pseudo-noise sequence associated with the base site 101 and an identification code for the particular communication unit 103, 104. In the preferred embodiment, the base site 101 and the controller 200 is part of a Motorola Supercell 9600 base station. Alternatively, the controller 200 may instead be disposed within a mobile switch, such as a Motorola EMX2500 switch, connected to the base site 101.

In an alternative preferred embodiment, each base site 101, 140 in the CDMA system 100 includes a plurality of RF channels referred to as carriers. Multiple carriers are typically added in CDMA systems to increase capacity of the system. Each carrier comprises prescribed bandwidths (e.g., 1.25 MHz for IS-95) for uplink (communication unit 103 to base site 101) and downlink (base site 101 to communication unit 103). At a call origination, the call is assigned to one of the carriers available in the cell of origination (target cell). A particular embodiment of the multicarrier system is illustrated in FIG. 2. Differences between the multicarrier embodiment of FIG. 2 and the embodiment of a single carrier system illustrated in FIG. 1 are as follows. Communication units 103, 104 have a capability to use different frequency bands, corresponding to different carriers, for transmitting and receiving. In the forward direction, radio signals corresponding to different carriers are combined by a combiner 160 before they are transmitted by the antenna. In the reverse direction, the radio signal received by the antenna is split into signals corresponding to different carriers. FIG. 2 shows different groups of transceivers 120 and 122 processing signals of different carriers. Modifications of the particular embodiment of a multicarrier system, described above, are also possible. For example, the transceivers 120, 122 do not have to be "dedicated" to specific carriers but can be shared by the carriers. Further detail of a suitable multicarrier system is described in the IS-95 standard.

Figure 3:
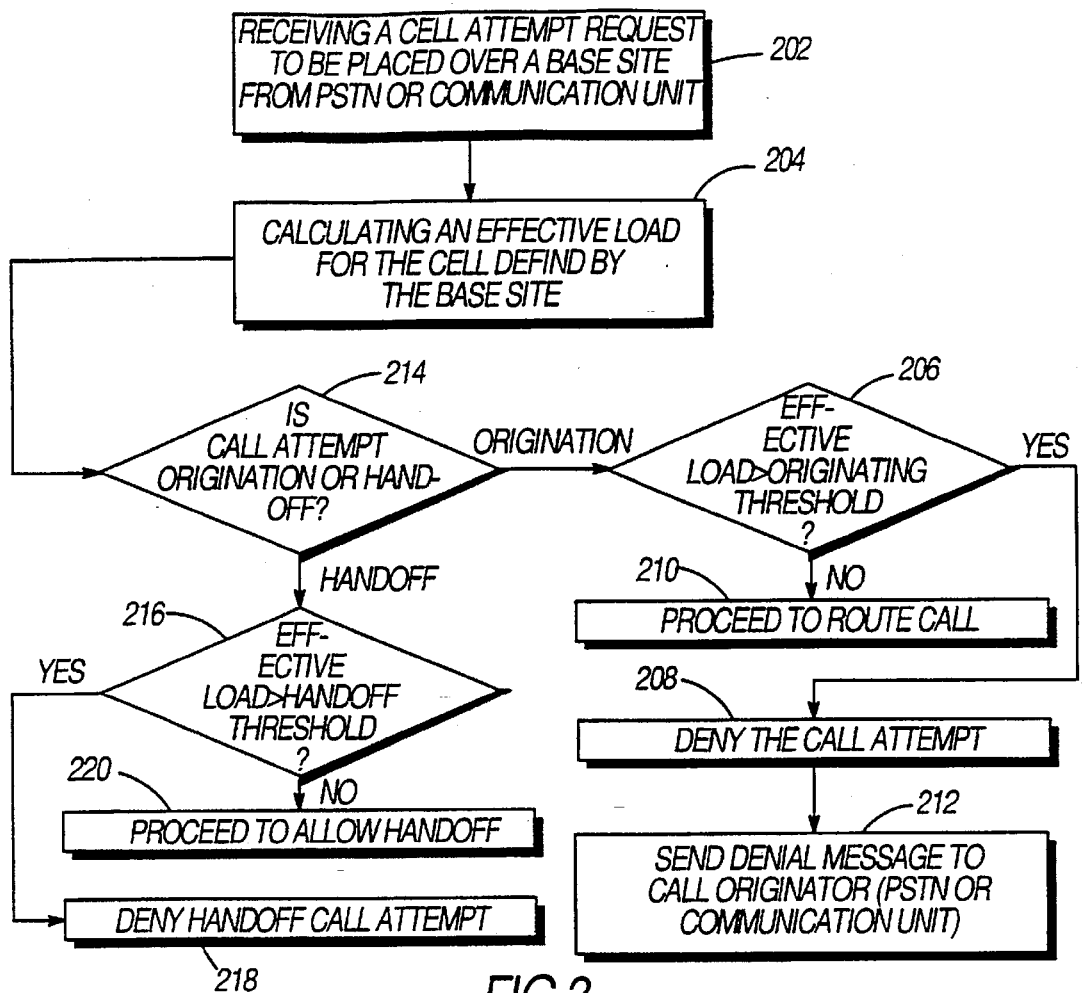
FIG. 3 is a flow chart illustrating a preferred embodiment of a method of blocking calls executed in a controller in the CDMA system of FIG. 1.

FIG. 3 is a flow chart illustrating a preferred embodiment of a call blocking routine that may be programmed into the controller 200 or 201 in communication with the base site 101 or 140. For purposes of illustration, reference will hereafter be made only to base site 101 and controller 200 although the method of either FIG. 2 or FIG. 3 is equally applicable to base site 140 and controller 201.

Referring now to FIG. 3, a call attempt request to be placed over the base site 101 is received from either the PSTN 115 via the MSC 113 or one of the communication units 103, 104, at 202. At 204, an effective load is calculated by the controller 200 for the target cell 130 defined by the coverage area of the base site 101. A preferred method of calculating effective load for the target cell 130 will be described in detail below. At decision step 214, a determination is made whether the call attempt is an original call attempt or a handoff call attempt. A handoff call attempt may occur when a communication unit, such as communication 105, moves from a non-target cell 132 into the target cell 130. If the call attempt is an origination, then processing continues at decision step 206; otherwise, processing continues at decision step 216.

At decision step 206, the calculated effective load is compared to a first threshold, referred to as an origination threshold. If the effective load exceeds the first threshold then the call attempt is denied, at 208, and the base site 101 sends a denial message to the call originator, either to the PSTN 115 via the MSC 113 or to a communication unit 103 or 104, at 212. However, if the effective load does not exceeds the first threshold then the call is routed at 210 and normal call processing is performed.

At decision step 216, the calculated effective load is compared to a second threshold, referred to as a handoff threshold. If the effective load exceeds the second threshold then the handoff call attempt is denied at 218. Otherwise, the handoff call is allowed at 220.

A preferred embodiment of a method of calculating the effective load and the thresholds is now described. The effective load for a target cell, such as cell 130 for base site 101, may be calculated in the controller 200 by adding the number of calls in the target cell to a weighted summation of the number of calls in non-target cells, such as adjacent cells. In a particular embodiment where there are a plurality of adjacent cells, and the cells are approximately the same size, each of the weights ion the weighted summation is set equal to a non-target cell interference factor divided by the number of adjacent cells. It should be understood that the number of calls in a cell includes calls that are in soft handoff with the cell. The non-target cell interference factor may be calculated by an estimate such as 0.55 as described in "Other-Cell Interference in Cellular Power-Controlled CDMA", by Viterbi et al., IEEE Transactions on Communications, Vol. 42, No. 2/3/4, p. 1501–1504 (1994), incorporated herein by reference. In an exemplary system where each cell in the system can support a maximum of eighteen calls and where the propagation law exponent is four, a preferred value for the origination threshold would be about 25, and a preferred value for the handoff threshold would be about 28.

An alternative preferred embodiment of the method of calculating the effective load is now described. The effective load for a target cell may be calculated as a function of the number of calls in the target cell and not in soft handoff with any other cell (Ko), the number of calls that are in soft handoff with the target cell and a non-target cell (Kh), and the number of calls in a non-target call that are not in soft handoff with the target cell (Kn). In particular, a weighted summation of the above factors, Ko, Kh, and Kn as set forth below is preferred:

$$Load = K_o + w1 \times K_h + w2 \times K_n$$

The first weight, w1, should be less than one and the second weight, w2, should be less than the non-target cell interference divided by the number of non-target cells. In a particular example, w1=1 and w2=0.09. The origination and handoff thresholds in this embodiment are typically less than 20. For example, the origination threshold may be about 16 and the handoff threshold may be about 19.

Another alternative preferred embodiment of the method of calculating the effective load is now described. This embodiment is suitable to applications where CDMA system forward link overload protection is used. The effective load for a target cell may be calculated as a function of the number of calls in the target cell and not in soft handoff with any other cell (K0), the number of calls that are in soft handoff with the target cell and one non-target cell (K1), and the number of calls that are in soft handoff with the target cell and two non-target cells (K2). In particular, a weighted summation of the above factors, K0, K1, and K2 as set forth below is preferred:

$$Load = v0*K_0 + v1*K1 + v2*K2$$

The weights v0, v1, and v2 are proportional to the average power to be allocated in the target cell to mobiles in the various types of a soft handoff. For example, the weights may be set as follows: v1=1, v2=0.9, and v3=0.8. The origination and handoff thresholds may be set to 15 and 18 respectively.

Figure 4:
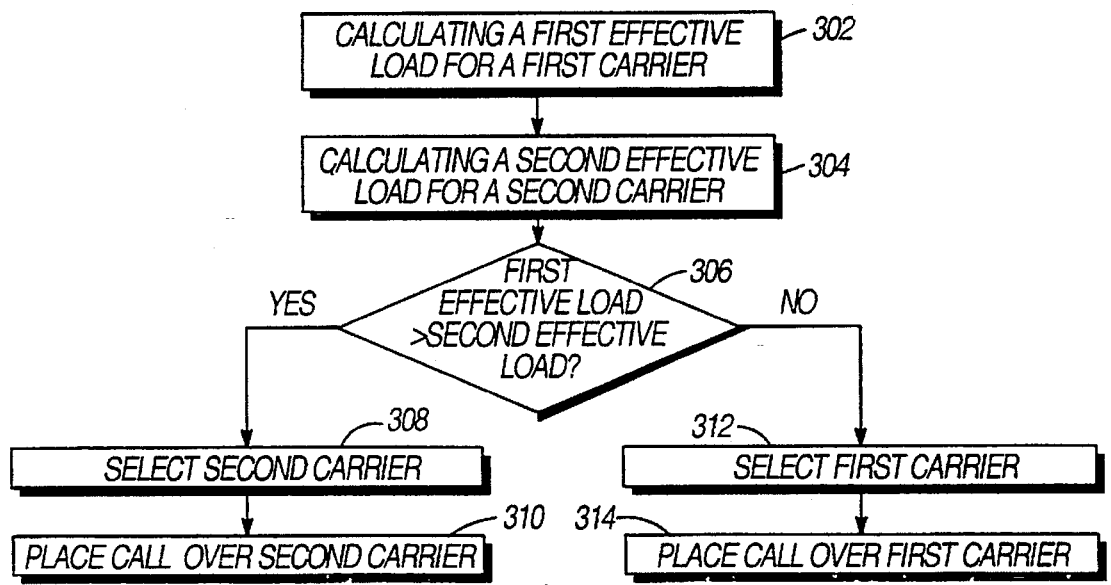
FIG. 4 is a flow chart illustrating a preferred embodiment of a method of selecting a carrier from a group of carriers supported by the base site of FIG. 1.

FIG. 4 is a flow chart illustrating a preferred embodiment of a carrier selection routine that may be programmed into the controller 200 in communication with the base site 101 in a system that has multiple carriers per cell 130. Referring to FIG. 3, the controller 200 calculates a first effective load for a first carrier, at 302, and calculates a second effective load for a second carrier, at 304. Both the first and second carriers are supported by the base site 101 and are used to communicate with communication units 103, 104. At 306, a comparison is made between the first effective load and the second effective load. If the first effective load exceeds the second effective load, then the controller 200 selects the second carrier, at 308, and places a call over the second carrier, at 310. However, if the first effective load does not exceed the second effective load, then the controller 200 selects the first carrier, at 312, and places the call over the first carrier. A person having ordinary skill in the art will appreciate that the selected carrier may either be used for a call origination or for a hard handoff.

Figure 5:
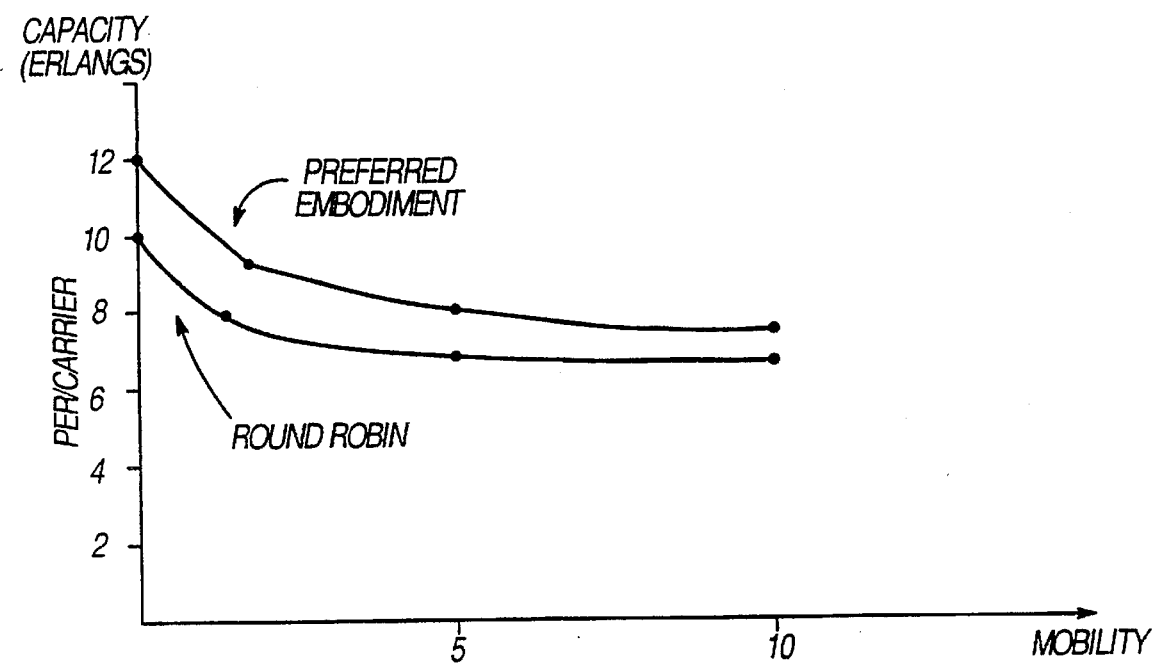
FIG. 5 is a graph illustrating capacity of the system of FIG. 1 using the method of FIG. 3.

The preferred embodiment described with respect to FIG. 4 has many benefits. For example, by using the calculated effective load to select a carrier from a group of potential carriers the call load over the various carriers is more efficiently balanced. As a result, the capacity of the CDMA system is advantageously improved. A comparison of capacity between the preferred embodiment and conventional systems is illustrated in FIG. 5. As shown in FIG. 5, the preferred embodiment has greater capacity regardless of the mobility of the communication units within the target cell 130.

In addition to those described herein, further advantages and modifications of the above described apparatus will readily occur to those skilled in the art. For example, both reverse and forward link power measurements in target and non-target cells may be used in the effective load calculations. In addition, although the preferred effective load is calculated using a weighted sum, alternative mathematical combinations may also be used.

The invention, in its broader aspects, is therefore not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. A method of controlling a call in a code division multiple access, CDMA, system comprising the steps of:

receiving a call attempt request to be placed over a target cell of the CDMA system;

calculating an effective load based on a measurement indicative of non-target cell interference or a number of calls in soft handoff with the target cell for the target cell;

comparing the effective load to a threshold; and denying the call attempt request by sending a denial message if the effective load exceeds the threshold.

2. A method of selecting a carrier from a group of carriers supported by a target cell of a code division multiple access, CDMA, system comprising the steps of:

calculating a first effective load based on a measurement indicative of non-target cell interference or a member of calls in soft handoff with the target cell for a first carrier of the group of carriers;

calculating a second effective load based on a measurement indicative of non-target cell interference or a number of calls in soft handoff with the target cell for a second carrier of the group of carriers;

comparing the first effective load to the second effective load; and selecting one of the first and second carriers in response to the comparison.

3. An apparatus for selectively blocking a call attempt in a code division multiple access, CDMA, system base station comprising:

a base station including a plurality of transceivers providing a radio communication channel and defining a target cell;

a base station controller coupled to the base station;

said base station controller receiving a call attempt request to be placed over one of the transceivers of the base station;

said base station controller calculating an effective load based on a measurement indicative of non-target cell interference or a number of calls in soft handoff with the target cell, comparing the effective load to a threshold, and denying the call attempt request by sending a denial message if the effective load exceeds the threshold.

4. The apparatus of claim 3, wherein the non-target cell interference is estimated based on an inverse of a propagation law exponent.

5. A code division multiple access, CDMA, system comprising:

a base station including a plurality of transceivers providing a radio communication channel and defining a target cell;

a communication unit located within the target cell;

a base station controller coupled to the base station;

said base station controller receiving a call attempt request from the communication unit over the radio communication channel;

said base station controller calculating an effective load based on a measurement indicative of non-target cell interference or a number of calls in soft handoff with the target cell, comparing the effective load to a threshold, and denying the call attempt request by sending a denial message to the communication unit if the effective load exceeds the threshold.

6. An apparatus for selecting a carrier from a group of carriers supported by a target cell of a code division multiple access, CDMA, system comprising:

means for calculating a first effective load based on a measurement indicative of non-target cell interference or a number of calls in soft handoff with the target cell for a first carrier of the group of carriers;

means for calculating a second effective load based on a measurement indicative of non-target cell interference or a number of calls in soft handoff with the target cell for a second carrier of the group of carriers;

means for comparing the first effective load to the second effective load; and means for selecting one of the first and second carriers in response to the comparison.

7. The apparatus of claim 6, wherein the CDMA system comprises one of a personal communication system and a wireless local loop system.

* * * * *

UNITED STATES PATENT AND TRADEMARK OFFICE
CERTIFICATE OF CORRECTION

PATENT NO. : 5,666,356
DATED : September 9, 1997
INVENTOR(S) : Fleming, et al.

It is certified that error appears in the above-indentified patent and that said Letters Patent is hereby corrected as shown below:

Column 6, line 22 reads "member" should be --number--.

Column 6, line 35 reads "system base station comprising" should be --system comprising--.

Signed and Sealed this

Twenty-third Day of December, 1997

Attest:

BRUCE LEHMAN

*Attesting Officer*      *Commissioner of Patents and Trademarks*